US012713445B2

(12) United States Patent
Shi et al.

(10) Patent No.: US 12,713,445 B2
(45) Date of Patent: Aug. 18, 2026

(54) METHODS AND SYSTEMS FOR MULTI-CELL TRANSMISSION

(71) Applicant: ZTE Corporation, Shenzhen (CN)

(72) Inventors: Jing Shi, Shenzhen (CN); Peng Hao, Shenzhen (CN); Xingguang Wei, Shenzhen (CN); Kai Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 271 days.

(21) Appl. No.: 18/521,434

(22) Filed: Nov. 28, 2023

(65) Prior Publication Data

US 2024/0155644 A1 May 9, 2024

Related U.S. Application Data

(63) Continuation of application No. PCT/CN2021/140381, filed on Dec. 22, 2021.

(51) Int. Cl.

| | |
|---|---|
| ***H04W 72/232*** | (2023.01) |
| ***H04B 7/06*** | (2006.01) |
| ***H04W 72/11*** | (2023.01) |
| ***H04W 72/1268*** | (2023.01) |

(52) U.S. Cl.

CPC ........ *H04W 72/232* (2023.01); *H04B 7/0626* (2013.01); *H04W 72/11* (2023.01); *H04W 72/1268* (2013.01)

(58) Field of Classification Search

None

See application file for complete search history.

(56) References Cited

U.S. PATENT DOCUMENTS

| | | | | |
|---|---|---|---|---|
| 11,228,990 | B2 * | 1/2022 | Jeon | H04W 52/50 |
| 11,483,856 | B2 * | 10/2022 | You | H04L 1/08 |
| 12,156,229 | B2 * | 11/2024 | Yi | H04L 5/0053 |
| 12,457,082 | B2 * | 10/2025 | Xu | H04L 25/0238 |
| 2017/0135090 | A1 | 5/2017 | Mn et al. | |
| 2017/0373741 | A1 | 12/2017 | Yang et al. | |
| 2018/0027549 | A1 | 1/2018 | Wang et al. | |
| 2018/0192414 | A1 * | 7/2018 | Takahashi | H04W 72/21 |
| 2021/0051690 | A1 * | 2/2021 | He | H04L 5/0053 |

(Continued)

FOREIGN PATENT DOCUMENTS

| | | |
|---|---|---|
| CN | 112564872 | 3/2021 |
| EP | 3270532 | 1/2018 |

(Continued)

OTHER PUBLICATIONS

International Search Report and Written Opinion for PCT/CN2021/140381, filed Dec. 22, 2021, Report dated Jun. 16, 2022, 10 pages.

(Continued)

*Primary Examiner* — Eunsook Choi

(74) *Attorney, Agent, or Firm* — Ashurst Perkins Coie LLP US

(57) ABSTRACT

Methods and systems for techniques for multi-cell transmission are disclosed. In an implementation, a method of wireless communication includes receiving, by a wireless device, a configuration of multiple traffic channels on multiple cells scheduled by a downlink control information (DCI), and transmitting the multiple traffic channels on the multiple cells.

20 Claims, 7 Drawing Sheets

Receive, by a wireless device, a configuration of multiple traffic channels on multiple cells scheduled by a downlink control information (DCI)
610

Transmit the multiple traffic channels on the multiple cells
620

(56) References Cited

U.S. PATENT DOCUMENTS

2021/0400704 A1* 12/2021 Xue ...................... H04L 5/0091
2022/0346125 A1* 10/2022 Oteri ................. H04W 72/1215
2022/0361112 A1* 11/2022 Dinan ................. H04W 52/365
2025/0047421 A1* 2/2025 Lee ....................... H04L 1/1854

FOREIGN PATENT DOCUMENTS

WO 2021/155842 8/2021
WO 2021/189422 9/2021

OTHER PUBLICATIONS

InterDigital, Inc. "A single DCI scheduling multi-cell"3GPP TSG RAN WG1 #102-e R1-2006474, e-Meeting, Aug. 17-28, 2020, 2 pages.
Extended European Search Report for Co-Pending EP Appl. No. 21968527.8, Report dated Apr. 29, 2024, 8 pages.
Communication pursuant to Article 94(3) EPC for co-pending European Patent Application No. 21 968 527.8, dated Jun. 24, 2026, 7 pages.

* cited by examiner

METHODS AND SYSTEMS FOR MULTI-CELL TRANSMISSION

CROSS-REFERENCE TO RELATED APPLICATION

This application is a continuation and claims priority to International Application No. PCT/CN2021/140381, filed on Dec. 22, 2021, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for multi-cell transmission are disclosed.

In one aspect, a method of data communication is disclosed. The method includes a method of wireless communication includes receiving, by a wireless device, a configuration of multiple traffic channels on multiple cells scheduled by a downlink control information (DCI), and transmitting the multiple traffic channels on the multiple cells.

In another aspect, a method of data communication is disclosed. The method includes configuring, by a network device, multiple traffic channels on multiple cells, the multiple traffic channels on the multiple cells being scheduled by a downlink control information (DCI), and receiving the multiple traffic channels on the multiple cells.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

Figure 1:
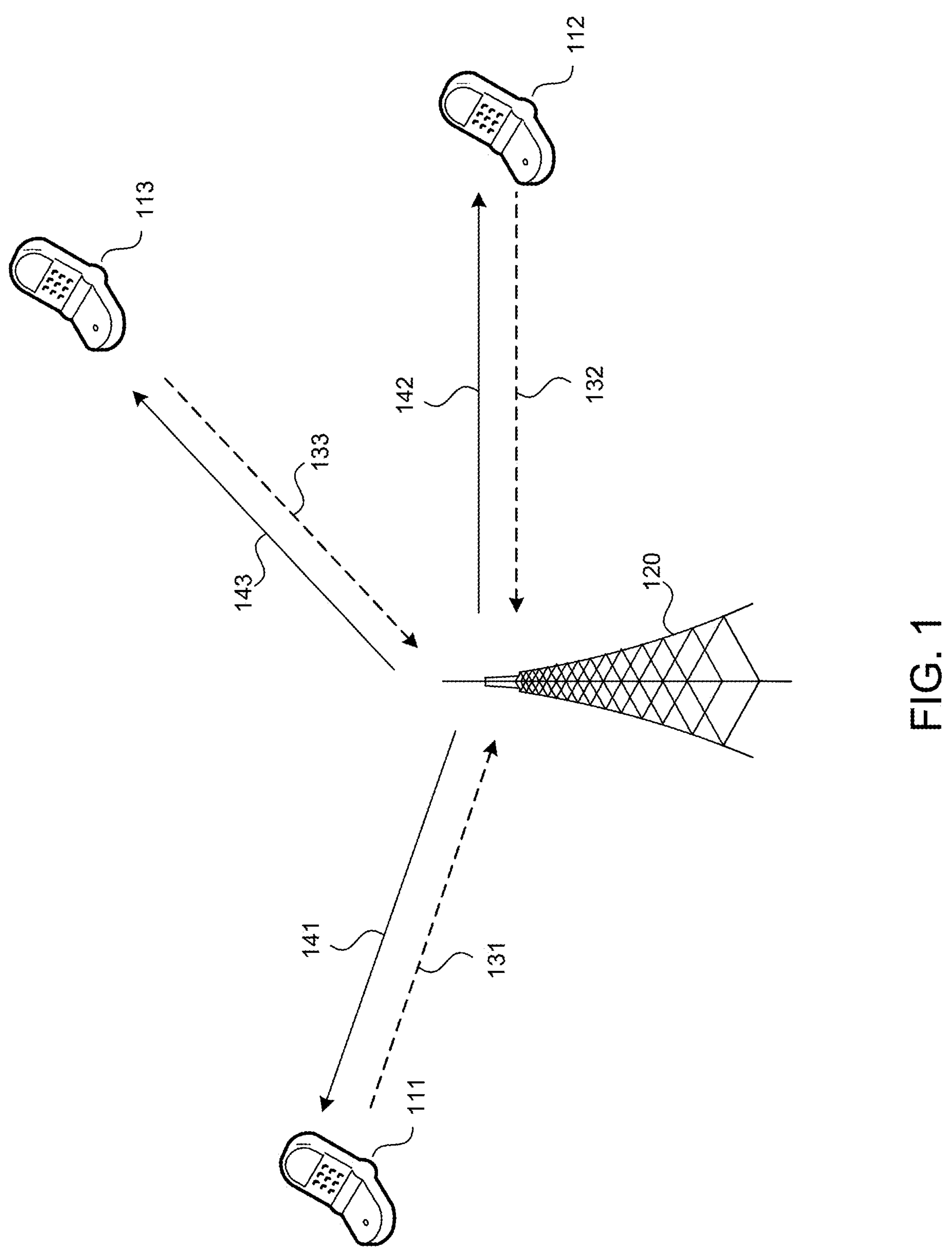
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
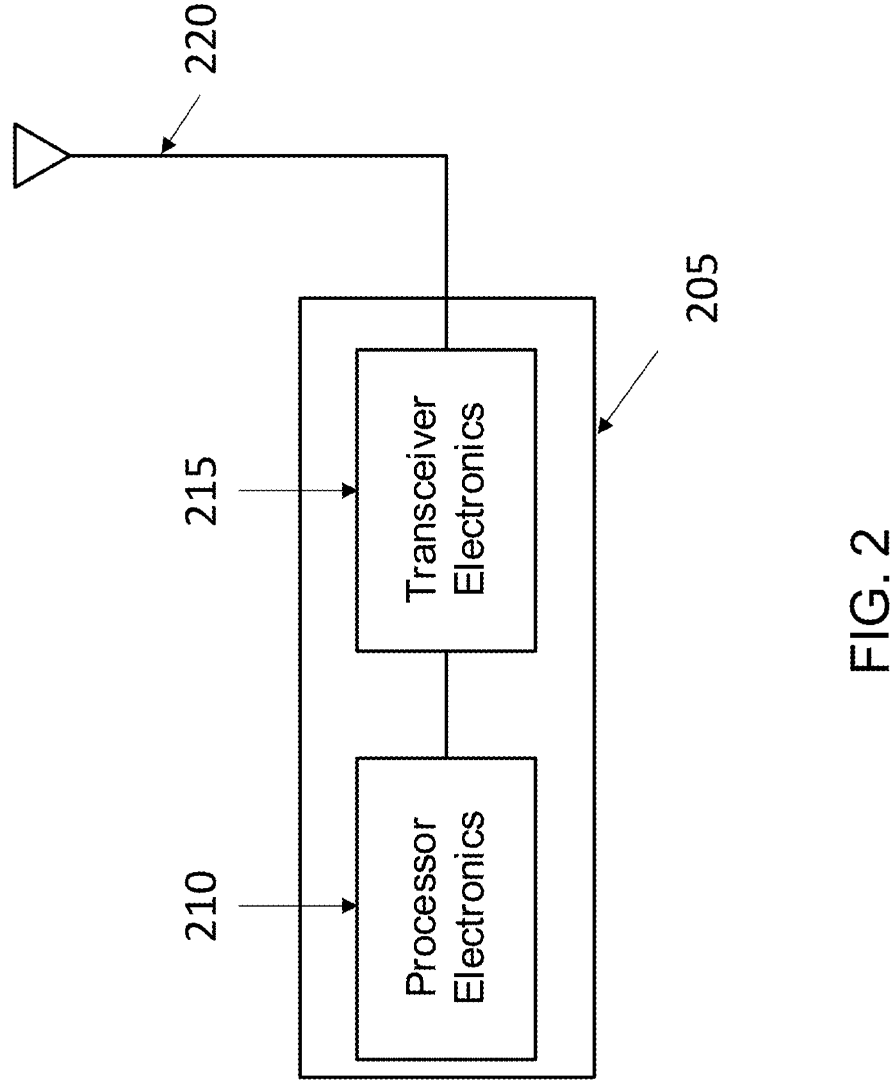
FIG. 2 is a block diagram representation of a portion of an apparatus based on some embodiments of the disclosed technology.

FIG. 2 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

The 4th Generation mobile communication technology (4G) Long-Term Evolution (LTE) or LTE-Advance (LTE-A) and the 5th Generation mobile communication technology (5G) face more and more demands. Based on the current development trend, 4G and 5G systems are developing supports on features of enhanced mobile broadband (eMBB), ultra-reliable low-latency communication (URLLC), and massive machine-type communication (mMTC). In addition, Carrier Aggregation (CA) can be used in both the 4G and 5G communication systems.

In the current carrier aggregation (CA) techniques, scheduling mechanism only allows scheduling of single-cell physical uplink shared channel (PUSCH)/physical downlink shared channel (PDSCH) per a scheduling DCI. With more available scattered spectrum bands, the need of simultaneous scheduling of multiple cells is expected to be increasing. To reduce the control overhead, it is beneficial to extend from single-cell scheduling to multi-cell PUSCH/PDSCH scheduling with a single scheduling downlink control information (DCI).

When multi-cell PUSCH scheduling with a single scheduling DCI is introduced, since different cells may be configured with different features, such as PUSCH repetition, multi-TTI (transmission time interval) scheduling on one cell, TBoMS (one TB on multi slots), how to perform a multi-cell scheduling should be determined.

Embodiment 1

Under the current standard, multi-PUSCH (multi-TTI (transmission time interval)) scheduling can be configured for a serving cell, and the PUSCH that carries an aperiodic channel state information (AP-CSI) feedback is the first PUSCH that satisfies the multiplexing timeline. When the downlink control information (DCI) schedules M PUSCHs, the PUSCH that carries the aperiodic CSI feedback is M-th scheduled PUSCH for M<=2, or (M−1)-th scheduled PUSCH for M>2. A UE is not expected to receive more than one DCI with non-zero channel state information (CSI) request field per slot per cell.

When a multi-cell PUSCH scheduling with a single scheduling DCI is introduced, some additional restrictions should be determined no matter whether the indication for the CSI request field in the UL grant is shared or separate.

In the case of a separate indication for the CSI request, one possible restriction is applicable when there is an error in the separate indication for CSI request. In addition, there can be another restriction that only one of the cells is valid and others should be discarded or ignored. The disclosed technology can be implemented in some embodiments to select the valid one cell.

In the case that a shared indication for the CSI request is used and is applied to only one cell, the disclosed technology can be implemented in some embodiments to select the one cell.

The disclosed technology can be implemented in some embodiments to determine the valid cell or the selected cell to transmit a feedback message, as will be discussed below.

Figure 3:
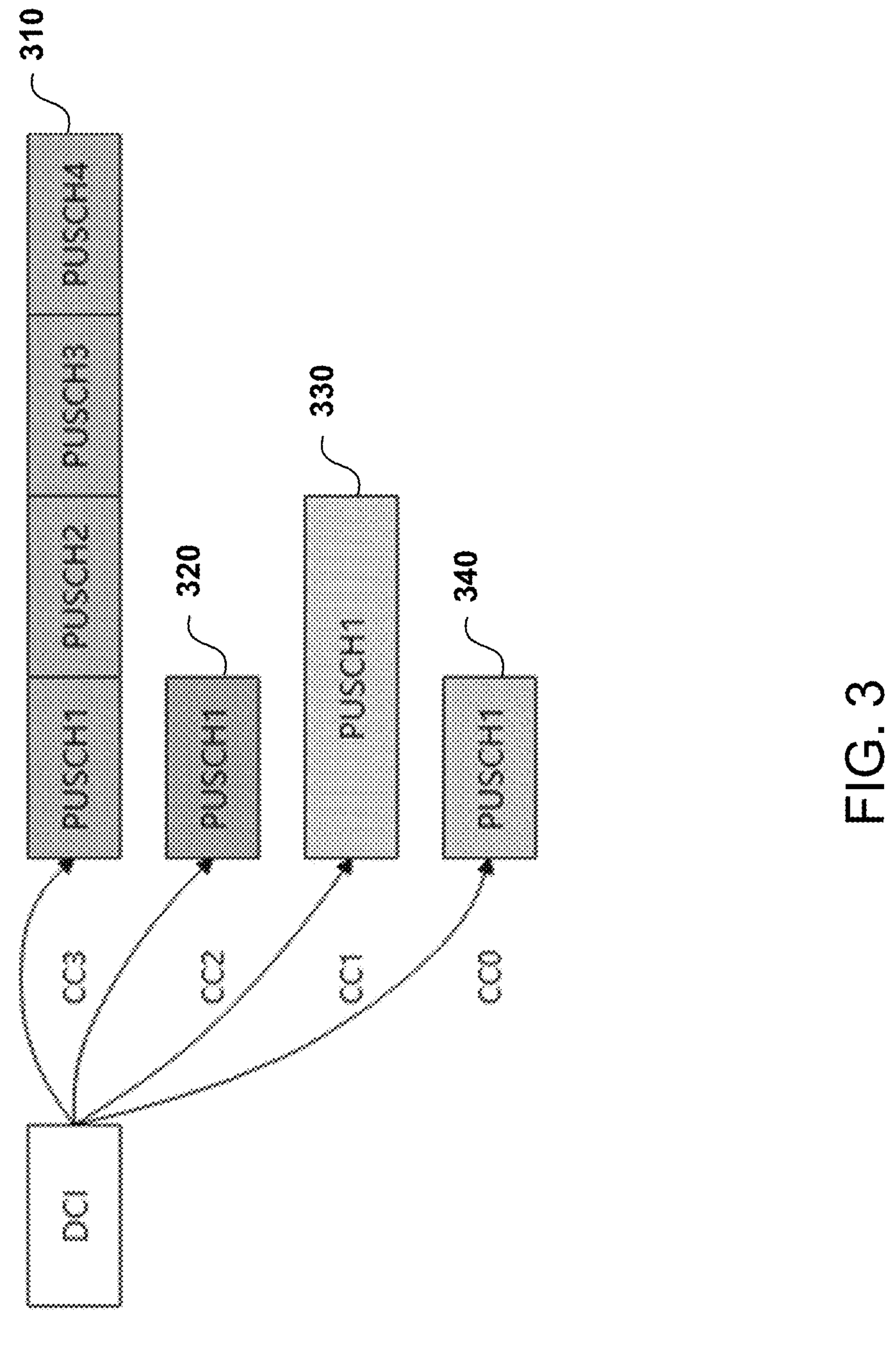
FIG. 3 shows an example of multi-cell scheduling based on some example embodiments of the disclosed technology.

FIG. 3 shows an example of multi-cell PUSCH scheduling based on some example embodiments of the disclosed technology. FIG. 3 shows four cells 310, 320, 330, 340 (CC0, CC1, CC2, CC3) as an example.

Method 1: the one cell is the predefined or configured cell, such as a cell with the lowest cell index.

For example, the DCI that is used for multi-cell scheduling triggers the CSI feedback by CSI request field, since a UE is not expected to receive more than one DCI with non-zero CSI request field per slot per cell, where the DCI is a legacy single DCI used for scheduling one or more PUSCHs on one cell. When multi-cell PUSCH scheduling is supported or used, only one PUSCH of the multi-cell PUSCH is used or selected to carry the aperiodic CSI feedback. In Method 1, the cell can be predefined or configured cell, such as a cell with the lowest cell index. If the cells CC0 to CC3 shown in FIG. 2 are scheduled by multi-cell scheduling DCI, and regardless of whether the indication or CSI request is shared or separate, the PUSCH on CC0 is used or selected to carry an aperiodic CSI feedback.

Figure 4:
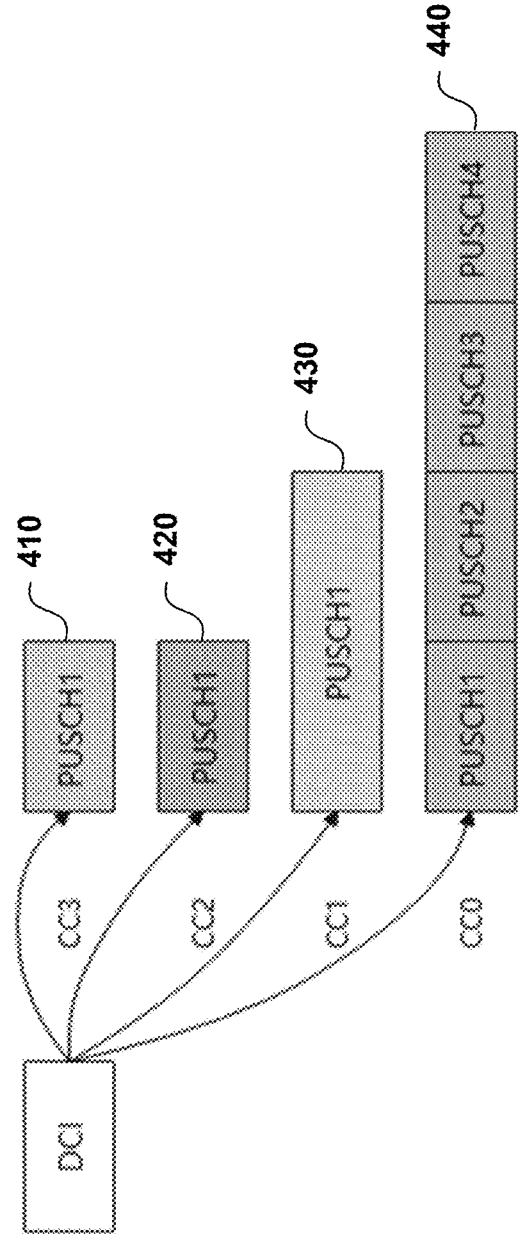
FIG. 4 shows another example of multi-cell scheduling based on some example embodiments of the disclosed technology.

FIG. 4 shows another example of PUSCH multi-cell scheduling based on some example embodiments of the disclosed technology. FIG. 4 shows four cells 410, 420, 430, 340 (CC0, CC1, CC2, CC3) as an example.

Method 2: the one cell is selected by a rule based on the type of PUSCH transmission. For example, the type of PUSCH transmission includes a single PUSCH, multi-TTI, and repetition, and TBoMS, and these can be combined with a cell index order from low to high. In one example, a cell configured with a single PUSCH is selected first, and then a cell configured with multi-TTI is selected, and then a cell with PUSCH repetition is selected, and then a cell using TBoMS scheduling is selected. Other PUSCH type orders can be combined too. In one example, a cell configured with a single PUSCH is selected first, and then a cell with PUSCH repetition is selected, and then a cell configured with multi-TTI is selected, and then a cell using TBoMS is selected.

For example, the DCI that is used for multi-cell scheduling triggers the CSI feedback by CSI request field, since a UE is not expected to receive more than one DCI with non-zero CSI request field per slot per cell, where the DCI is a legacy single DCI used for scheduling one or more PUSCHs on one cell. When multi-cell PUSCH scheduling is supported or used, only one PUSCH of the multi-cell PUSCH is used or selected to carry the aperiodic CSI feedback. In Method 2, a cell with a single PUSCH is selected first, and then a cell with multi-TTI is selected, and then a cell with repetition, and then a cell with TBoMS is selected, and the selection is made based on the cell index order from low to high. If the cells CC0 to CC3 shown in FIG. 4 are scheduled by multi-cell scheduling DCI and regardless of whether the indication of the CSI request is shared or separate, the PUSCH on CC2 is used or selected to carry the aperiodic CSI feedback. Here, the CC0 is configured with multi-TTI scheduling and 4 PUSCH are scheduled on CC0, the CC1 is configured with TBoMS scheduling and 1 PUSCH on two slots are scheduled on CC1, and a single PDSCH is scheduled on CC2 and CC3.

Figure 5:
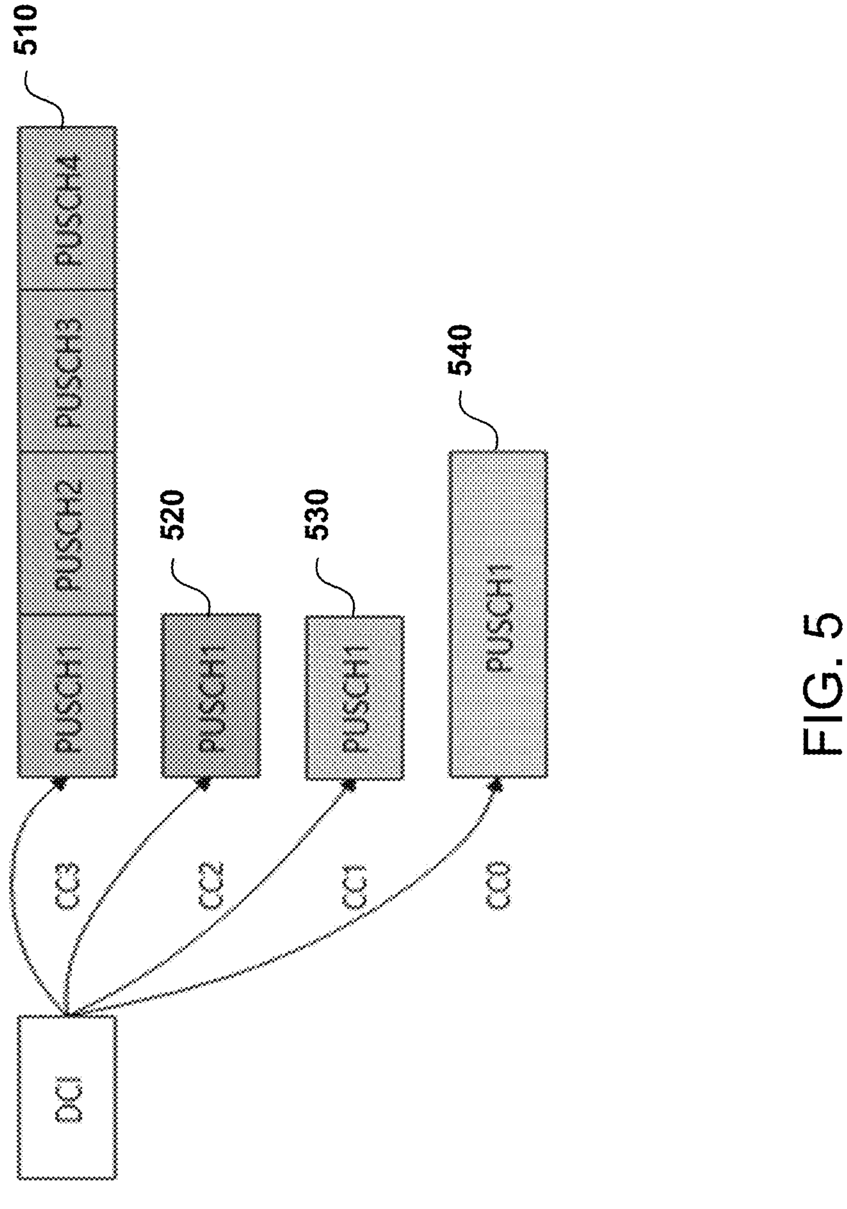
FIG. 5 shows another example of multi-cell scheduling based on some example embodiments of the disclosed technology.

FIG. 5 shows another example of PUSCH multi-cell scheduling based on some example embodiments of the disclosed technology. FIG. 5 shows four cells 510, 520, 530, 540 (CC0, CC1, CC2, CC3) as an example.

Method 3: Based on method 1 and some additional restrictions, such as if the cell is used for TBoMS, then skip this cell and choose the next valid cell.

For example, the DCI that is used for multi-cell scheduling triggers the CSI feedback by CSI request field, since a UE is not expected to receive more than one DCI with non-zero CSI request field per slot per cell, where the DCI is a legacy single DCI used for scheduling one or more PUSCHs on one cell. When multi-cell PUSCH scheduling is supported or used, only one PUSCH of the multi-cell PUSCH is used or selected to carry the aperiodic CSI feedback. In Method 3, if the cell is used for TBoMS, this cell is skipped and the next valid cell is selected as selected in Method 1. If the cells CC0 to CC3 shown in FIG. 5 are scheduled by multi-cell scheduling DCI and regardless of whether the indication of CSI request is shared or separate, the PUSCH on CC1 is used or selected to carry the aperiodic CSI feedback. Here, the CC0 is configured with TBoMS scheduling and 1 PUSCH on two slots are scheduled on CC0, a single PDSCH is scheduled on CC1 and CC2, and CC3 is configured with multi-TTI scheduling and 4 PUSCHs are scheduled on CC3.

In this way, a multi-cell scheduling can be performed or configured together to reduce the control overhead. Only one cell is used or selected to carry the aperiodic CSI feedback based on some embodiments of the disclosed technology. The DCI size can be reduced by a shared indication for CSI request field, which make the multi-cell scheduling more feasible.

Embodiment 2

Under the current standard, a semi-persistent scheduling (SPS) PDSCH or a configured grant (CG) type 2 PUSCH can be configured for a serving cell and activated or released by the corresponding DCI.

The disclosed technology can be implemented in some embodiments to perform UL grant Type 2 PUSCH or downlink (DL) semi-persistent scheduling (SPS) combined with multi-cell scheduling. When multi-cell PUSCH/PDSCH scheduling with a single scheduling DCI is introduced, how to perform UL grant Type 2 PUSCH or DL SPS combined with multi-cell scheduling should be determined.

Method 1: all the scheduled cells are simultaneously activated or deactivated.

The indications of the fields for validation are shared, or separately indicated with the restriction of simultaneous activation or simultaneous release. For example, HARQ process number is set to all 0s and the indication is shared for all scheduled cells, and a redundancy version is set to all 0s and the indication shared for all scheduled cells. No matter whether the indication of frequency domain resource allocation (FDRA) is shared or separate indication for different cells, the FDRA for each scheduled cell is set to actually allocated resources to be simultaneously activated or is set to all is to be simultaneously deactivated.

Method 2: each cell can be activated or released independently. Further, the indication of at least one of {NDI, HPN, RV} is shared for all the scheduled cells.

The fields for validation are separately indicated. For example, Cell 1 is activated by multi-cell scheduling DCI, where HARQ process number is set to all '0's, and a redundancy version is set to all '0's, and the frequency domain resource assignment is set to the actually allocated resources. Cell 2 is deactivated by the same multi-cell scheduling DCI, where HARQ process number is set to all '0's, and the redundancy version is set to all '0's, and the frequency domain resource assignment is set to all '1's.

Method 3: In a case that 1st DCI is only for the first PDSCH and 2nd DCI in the first PDSCH, both the unicast and CG-type2/SPS can be included in the 2nd DCI with an additional field to indicate C-RNTI or CS-RNTI. That is, two-stage DCI is used to schedule multi-cell transmission, where the 1st DCI (first DCI as discussed below) is only for the first PDSCH and the 2nd DCI (second DCI as discussed below) in the first PDSCH used to schedule other channels on other cells.

The 2nd DCI includes multi-cell scheduling information. For example, for Cell 1, DCI format is used to schedule dynamic unicast PDSCH, and a cell radio network temporary identifier (C-RNTI) is indicated for Cell 1, while for Cell 2, DCI format is used to activate SPS PDSCH, then a configured scheduling radio network temporary identifier (CS-RNTI) is indicated for Cell 2.

In this way, a multi-cell scheduling can be performed and configured together with DL SPS or UL grant type 2 for flexible scheduling and for further control overhead reduction. Multi-cell scheduling for DL SPS or UL grant type 2, optionally combined with a unicast scheduling, is provided based on some embodiments of the disclosed technology. The DCI size can be reduced by a shared indication for the validation fields, which make the multi-cell scheduling combined with DL SPS or UL grant type 2 more feasible.

Embodiment 3

Under the current standard, a multi-PUSCH (multi-TTI) scheduling can be configured for a serving cell. When multi-cell PUSCH scheduling with a single scheduling DCI is introduced, since multi-TTI scheduling on one cell is also used to reduce the control overhead, some additional restrictions should be determined when both the multi-cell scheduling and multi-TTI scheduling are used.

When multi-PUSCH on one cell is configured, and multi-cell scheduling is also configured for the same UE, the disclosed technology can be implemented in some embodiments to determine the restriction on the maximum number of scheduled PUSCH in a case both multi-TTI and multi-cell scheduling are configured.

Method 1: the maximum number of scheduled PUSCH is determined by the maximum number of multi-cell scheduling and the maximum number of multi-TTI scheduling. In some implementations, the maximum number of scheduled PUSCH is determined by multiplying a maximum number of configured cells for the multi-cell scheduling or a number of cells configured with multi-TTI scheduling by a maximum number of configured PUSCHs for the multi-TTI scheduling across cells configured with multi-TTI scheduling within the multi-cell scheduling.

For example, if the maximum number of multi-cell PUSCH scheduling is 8, and the maximum number of multi-TTI PUSCH scheduling is 8 across 4 cells, then the maximum number of scheduled PUSCH in a case that both the multi-TTI and multi-cell scheduling are configured is 8*8=64, or 8*4=32.

Method 2: the maximum number of scheduled PUSCH is determined by the maximum number of multi-cell scheduling.

For example, if the maximum number of multi-cell PUSCH scheduling is 4, and the maximum number of multi-TTI PUSCH scheduling is 8, then the maximum number of scheduled PUSCH in a case that both the multi-TTI and multi-cell scheduling are configured is 4. For example, CC0 to CC3 can be scheduled by one DCI for multi-cell scheduling, and CC1 is also configured with multi-TTI scheduling, then one actual scheduling is single PUSCH on CC0, 2 PUSCHs used multi-TTI scheduling on CC1, and single PUSCH on CC2, the total PUSCH is 4.

Method 3: the maximum number of scheduled PUSCH is determined by the maximum number of multi-TTI scheduling.

For example, if the maximum number of multi-cell PUSCH scheduling is 4, and the maximum number of multi-TTI PUSCH scheduling is 8, then the maximum number of scheduled PUSCH in a case that both the multi-TTI and multi-cell scheduling are configured is 8. For example, the cells CC0 to CC3 can be scheduled by one DCI for multi-cell scheduling, and the cells CC0 to CC3 are also configured with multi-TTI scheduling, then one actual scheduling is 4 PUSCHs using multi-TTI scheduling on CC0, 2 PUSCHs using multi-TTI scheduling on CC1, a single PUSCH on CC2, and a single PUSCH on CC3, and thus the total PUSCH is 8.

Method 4: the maximum number of scheduled PUSCH is determined by the maximum of {maximum number of multi-cell scheduling, maximum number of multi-TTI scheduling}.

For example, if the maximum number of multi-cell PUSCH scheduling is 4, and the maximum number of multi-TTI PUSCH scheduling is 8, then the maximum number of scheduled PUSCH in a case that both the multi-TTI and multi-cell scheduling are configured is 8. For example, the cells CC0 to CC3 can be scheduled by one DCI for multi-cell scheduling, and the cells CC0 to CC3 are also configured with multi-TTI scheduling, then one actual scheduling is 4 PUSCHs using multi-TTI scheduling on CC0, 2 PUSCHs using multi-TTI scheduling on CC1, a single PUSCH on CC2, and a single PUSCH on CC3, and thus the total PUSCH is 8.

Method 5: the maximum number of scheduled PUSCH is determined by a higher layer signaling, or based on Methods 1-4 above, combined with a higher layer signaling to scale the result of Methods 1-4.

For example, if the maximum number of multi-cell PUSCH scheduling is 4, and the maximum number of multi-TTI PUSCH scheduling is 8, then the maximum number of scheduled PUSCH in a case that both multi-TTI and multi-cell scheduling are configured is N, where N is configured by a higher layer signaling (e.g., N=16).

For example, based on Method 1 combined with a scaling factor, if the maximum number of multi-cell PUSCH scheduling is 4, and the maximum number of multi-TTI PUSCH scheduling is 8, then the maximum number of scheduled PUSCH in a case that both the multi-TTI and multi-cell scheduling are configured is 4*8*A, where A is a scaling factor configured by a higher layer signaling (e.g., if A=0.5, the result is 16).

For example, based on Method 4 combined with a scaling factor, if the maximum number of multi-cell PUSCH scheduling is 4, and the maximum number of multi-TTI PUSCH scheduling is 8, then the maximum number of scheduled PUSCH in a case that both the multi-TTI and multi-cell scheduling are configured is 8*A, where A is a scaling factor configured by a higher layer signaling (e.g., if A=2, the result is 16).

In this way, the multi-cell scheduling and multi-TTI scheduling can be performed and configured together, thereby reducing the control overhead. The maximum number of PUSCHs are restricted based on some embodiments, which make the multi-cell scheduling combined with multi-TTI scheduling more feasible.

Embodiment 4

Under the current standard, both the licensed carrier/cell/band and unlicensed carrier/cell/band can be used for data transmission. When a multi-cell PUSCH scheduling with a single scheduling DCI is introduced, a multi-cell scheduling combined with unlicensed carrier/cell/band should be considered.

In a case that all the scheduled cells of the multi-cell scheduling are unlicensed cell, each field in the DCI format can be shared or separately indicated.

Optionally, a multi-cell scheduling can be performed only with Clear Channel Assessment (CCA) success on all the scheduled cells. Optionally, a multi-cell scheduling can be performed only on the scheduled cells with CCA success.

In a case that the scheduled cells of the multi-cell scheduling are partially unlicensed cells and partially licensed cell, each field in the DCI format can be shared or separately indicated. In one example, at least one DCI field can be a separate indication for licensed cells and unlicensed cells. In another example, at least one DCI field can be a shared indication for licensed cells. In another example, at least one DCI field can be a shared indication for unlicensed cells. In one example, FDRA field is at least a separate indication for licensed cells and unlicensed cells. In another example, FDRA field is a shared indication for all the licensed cells, or a group of licensed cells. In another example, FDRA field is a shared indication for all the unlicensed cells, or a group of unlicensed cells.

In this way, a multi-cell scheduling can be performed or configured together with unlicensed carrier/cell/band for flexible scheduling and control overhead reduction. Multi-cell scheduling for unlicensed cell, optionally combined with a licensed cell is provided based on some embodiments of the disclosed technology. The DCI size can be reduced by a shared indication for the validation fields, which make the multi-cell scheduling combined with unlicensed cell more feasible.

The disclosed technology can be implemented in some embodiments to provide a multi-cell PUSCH scheduling.

In some embodiments, the valid or the applied one cell can be determined to carry AP-CSI feedback in the case of multi-cell scheduling. In Method 1, the one cell is a predefined or configured cell, such as a cell with the lowest cell index. In Method 2, the one cell is selected by a rule based on the type of PUSCH transmission. In Method 3, based on Method 1 and some additional restrictions, if the cell is used for TBoMS, this cell is skipped and the next valid cell is selected.

In some embodiments, UL grant Type 2 PUSCH or DL SPS combined with multi-cell scheduling is determined by one of the following methods. In Method 1, all the scheduled cells are simultaneously activated or deactivated. In Method 2, each cell can be activated or released independently. Further, at least one of {NDI, HPN, RV} is a shared indication for all the scheduled cells. In Method 3, in a case that 1st DCI is only for the first PDSCH and 2nd DCI in the first PDSCH, both the unicast and CG-type2/SPS can be included in the 2nd DCI with an additional field to indicate C-RNTI or CS-RNTI.

In some embodiments, the restriction on the maximum number of scheduled PUSCH in a case that both the multi-TTI and multi-cell scheduling are configured is determined by one of the following methods. Method 1: the maximum number of scheduled PUSCH is determined by the maximum number of multi-cell scheduling and the maximum number of multi-TTI scheduling. Method 2: the maximum number of scheduled PUSCH is determined by the maximum number of multi-cell scheduling. Method 3: the maximum number of scheduled PUSCH is determined by the maximum number of multi-TTI scheduling. Method 4: the maximum number of scheduled PUSCH is determined by the maximum of {maximum number of multi-cell scheduling, maximum number of multi-TTI scheduling}. Method 5: the maximum number of scheduled PUSCH is determined by higher layer signaling, or based method 1/2/3/4 combined with higher layer signaling to scale the result of method 1/2/3/4.

In some embodiments, the restriction on the multi-cell scheduling for an unlicensed carrier/cell/band includes at least one of the following. (1) in a case that all the scheduled cells of the multi-cell scheduling are unlicensed cells, a multi-cell scheduling can be performed only with CCA success on all the scheduled cells. (2) In a case that the scheduled cells of the multi-cell scheduling are partially unlicensed cells and partially licensed cells, one DCI field can be a separate indication for licensed cells and unlicensed cells, or can be a shared indication for licensed cells, or can be a shared indication for unlicensed cells.

Figure 6:
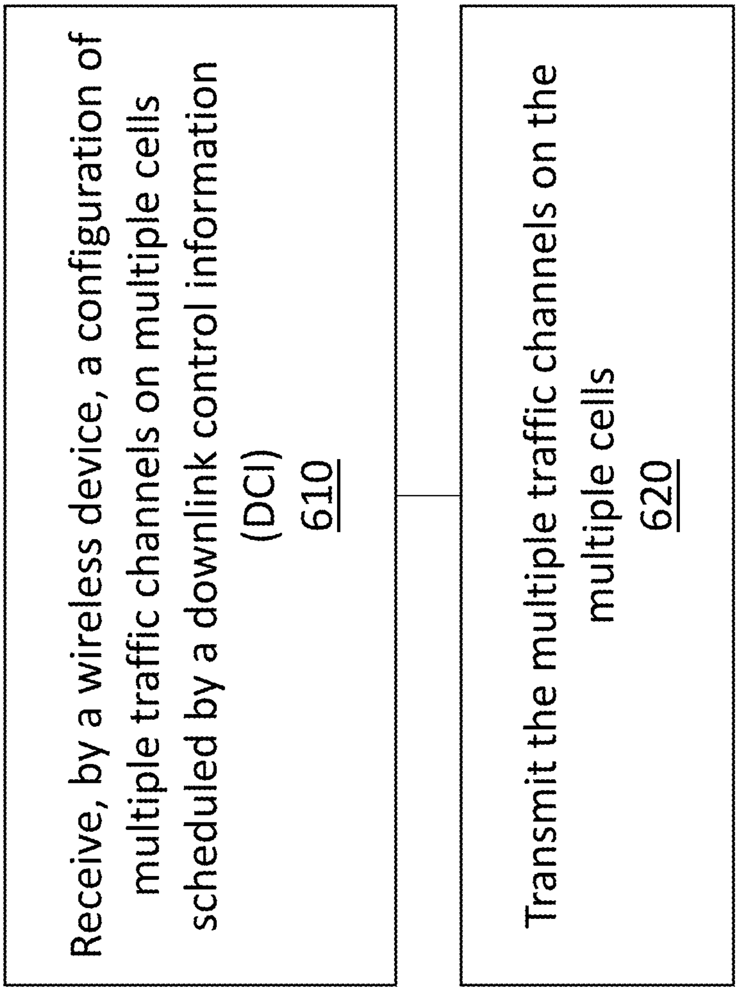
FIG. 6 shows an example of a process for wireless communication based on some example embodiments of the disclosed technology.

FIG. 6 shows an example of a process for wireless communication based on some example embodiments of the disclosed technology.

In some implementations, the process 600 for wireless communication may include, at 610, receiving, by a wireless device, a configuration of multiple traffic channels on multiple cells scheduled by a downlink control information (DCI), and, at 620, transmitting the multiple traffic channels on the multiple cells.

In one example, one of the multiple traffic channels on the multiple cells is selected to transmit a feedback message. Here, the feedback message may include channel state information (CSI). In one example, the multiple traffic channels include PUSCH, and wherein a maximum number of PUSCHs is determined based on at least one of: a maximum number of configured cells for a multi-cell scheduling; a maximum number of configured PUSCHs for a multi-TTI scheduling across cells configured with multi-TTI scheduling within the multi-cell scheduling; a number of cells configured with a multi-TTI scheduling; or a higher layer signaling configuration.

Figure 7:
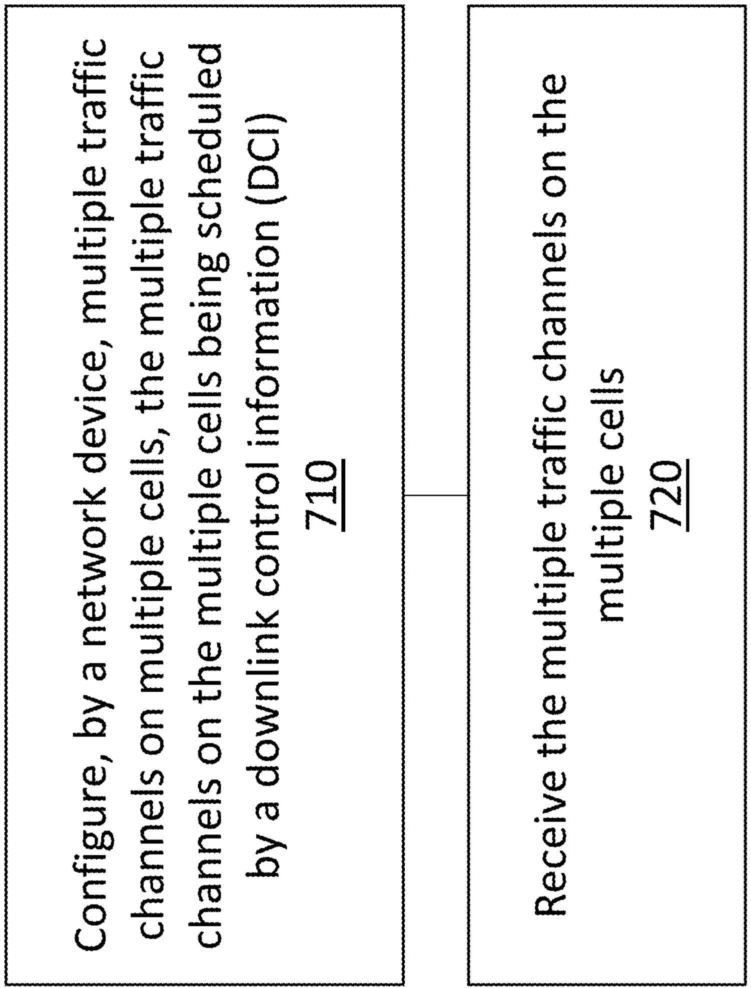
FIG. 7 shows another example of a process for wireless communication based on some example embodiments of the disclosed technology.

FIG. 7 shows another example of a process for wireless communication based on some example embodiments of the disclosed technology.

In some implementations, the process 700 for wireless communication may include, at 710, configuring, by a network device, multiple traffic channels on multiple cells, the multiple traffic channels on the multiple cells being scheduled by a downlink control information (DCI), and, at 720, receiving the multiple traffic channels on the multiple cells In one example, one of the multiple traffic channels on the multiple cells is selected to transmit a feedback message. Here, the feedback message may include channel state information (CSI). In one example, the multiple traffic channels include PUSCH, and wherein a maximum number of PUSCHs is determined based on at least one of: a maximum number of configured cells for a multi-cell scheduling; a maximum number of configured PUSCHs for a multi-TTI scheduling across cells configured with multi-TTI scheduling within the multi-cell scheduling; a number of cells configured with a multi-TTI scheduling; or a higher layer signaling configuration.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication, comprising receiving, by a wireless device, a configuration of multiple traffic channels on multiple cells scheduled by a downlink control information (DCI); and transmitting the multiple traffic channels on the multiple cells.

Clause 2. The method of clause 1, wherein one of the multiple traffic channels on the multiple cells is selected to transmit a feedback message.

Clause 3. The method of clause 2, wherein the feedback message includes a channel state information (CSI).

Clause 4. The method of clause 2, wherein the one of the multiple traffic channels on the multiple cells is selected based on a rule or a configuration.

Clause 5. The method of clause 4, wherein the rule includes selecting one of the multiple traffic channels on one of the multiple cells based on a cell index.

Clause 6. The method of clause 5, wherein a cell with a lowest cell index is selected among the multiple cells.

Clause 7. The method of clause 6, wherein the cell with the lowest cell index is selected after skipping the cell with transport block on multiple slots (TBoMS) transmission among the multiple cells.

Clause 8. The method of clause 4, wherein the rule includes selecting one of the multiple traffic channels on the multiple cells based on a transmission type of the traffic channel, wherein the transmission type includes at least one of: a single physical uplink shared channel (PUSCH), multiple PUSCHs on one cell, PUSCH repetition type A, PUSCH repetition type B, TBoMS, wherein multi-transmission-time-interval (multi-TTI) scheduling includes scheduling multiple PUSCHs on one cell by a single DCI.

Clause 9. The method of clause 8, the one of the multiple traffic channels on the multiple cells is selected based on the transmission type of the traffic channel, wherein the transmission type includes at least one of: a cell scheduled with a single physical uplink shared channel (PUSCH) with the lowest or configured cell index among the multiple cells is selected; if there is no single PUSCH on any cell in a multi-cell scheduling, a cell scheduled with multi-TTI scheduling with the lowest or configured cell index among the multiple cells is selected; if there is no single PUSCH or multi-TTI scheduling on any cell in the multi-cell scheduling, a cell scheduled with PUSCH repetition with the lowest or configured cell index among the multiple cells is selected; if there is no single PUSCH, a multi-TTI scheduling or PUSCH repetition on any cell in the multi-cell scheduling, a cell scheduled using TBoMS with the lowest or configured cell index among the multiple cells is selected.

Clause 10. The method of clause 1, wherein the wireless device is configured with a configured grant (CG) type 2 PUSCH or a semi-persistent scheduling (SPS) physical downlink shared channel (PDSCH) on one or more cells and activation or deactivation of the CG type 2 PUSCH or the SPS PDSCH according to the DCI.

Clause 11. The method of clause 10, wherein the cells scheduled with at least one of the CG type 2 and the SPS in a multi-cell scheduling are activated or deactivated simultaneously or independently.

Clause 12. The method of clause 11, wherein the DCI comprises one or more shared indication fields, including at least one of: new data indicator (NDI), hybrid automatic repeat request (HARQ) process number (HPN), and redundancy version (RV).

Clause 13. The method of clause 10, wherein the DCI includes a first DCI for scheduling a first PDSCH and one or more second DCIs in the first PDSCH, and wherein each second DCI includes a field to indicate each second DCI itself with cell radio network temporary identifier (C-RNTI) or configured scheduling radio network temporary identifier (CS-RNTI).

Clause 14. The method of clause 1, wherein the multiple traffic channels include PUSCH, and wherein a maximum number of PUSCHs is determined based on at least one of: a maximum number of configured cells for a multi-cell scheduling; a maximum number of configured PUSCHs for a multi-TTI scheduling across cells configured with multi-TTI scheduling within the multi-cell scheduling; a number of cells configured with a multi-TTI scheduling; and a higher layer signaling configuration.

Clause 15. The method of clause 14, wherein a maximum number of scheduled PUSCHs is determined by multiplying a maximum number of configured cells for the multi-cell scheduling or a number of cells configured with multi-TTI scheduling by a maximum number of configured PUSCHs for the multi-TTI scheduling across cells configured with multi-TTI scheduling within the multi-cell scheduling.

Clause 16. The method of clause 14, wherein a maximum number of scheduled PUSCHs is the maximum number of configured cells for the multi-cell scheduling.

Clause 17. The method of clause 14, wherein a maximum number of scheduled PUSCHs is the maximum number of configured PUSCHs for the multi-TTI scheduling across cells configured with the multi-TTI scheduling within the multi-cell scheduling.

Clause 18. The method of clause 14, wherein a maximum number of scheduled PUSCHs is determined based on a greater value between the maximum number of configured cells for the multi-cell scheduling and the maximum number of configured PUSCHs for the multi-TTI scheduling across cells configured with multi-TTI scheduling within the multi-cell scheduling.

Clause 19. The method of any of clauses 15-18, wherein the maximum number of scheduled PUSCHs is configured by a higher layer signaling or is configured by a higher layer parameter to scale the determined maximum number of scheduled PUSCHs.

Clause 20. The method of clause 1, wherein the multiple cells scheduled by the DCI comprise at least one unlicensed cell, and wherein at least one field in the DCI is used by at least one of: a shared indication for partial or all unlicensed cells within the multiple cells; a shared indication for partial or all licensed cells within the multiple cells; a shared indication for all multiple cells and be ignored for the licensed cells within the multiple cells; or a separate indication for licensed cells within the multiple cells and unlicensed cells within the multiple cells.

Clause 21. A method of wireless communication, comprising: configuring, by a network device, multiple traffic channels on multiple cells, the multiple traffic channels on the multiple cells being scheduled by a downlink control information (DCI); and receiving the multiple traffic channels on the multiple cells.

Clause 22. The method of clause 1, wherein one of the multiple traffic channels on the multiple cells is selected to receive a feedback message.

Clause 23. The method of clause 1, wherein a configured grant (CG) type 2 physical uplink shared channel (PUSCH) or a semi-persistent scheduling (SPS) physical downlink shared channel (PDSCH) is configured on one or more cells and activation or deactivation of the CG type 2 PUSCH or the SPS PDSCH according to the DCI.

Clause 24. The method of clause 1, wherein the multiple traffic channels include one or more PUSCHs, and wherein a maximum number of PUSCHs is determined based on at least one of: a maximum number of configured cells for a multi-cell scheduling; a maximum number of configured PUSCHs for a multi-TTI scheduling across cells configured with multi-TTI scheduling within the multi-cell scheduling; a number of cells configured with a multi-TTI scheduling; or a signaling layer configuration.

Clause 25. An apparatus for wireless communication comprising a processor that is configured to carry out the method of any of clauses 1 to 24.

Clause 26. A non-transitory computer readable medium having code stored thereon, the code when executed by a processor, causing the processor to implement a method recited in any of clauses 1 to 24.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

receiving, by a wireless device, a configuration of multiple traffic channels on multiple cells scheduled by a downlink control information (DCI); and transmitting the multiple traffic channels on the multiple cells, wherein one of the multiple traffic channels on the multiple cells is selected to transmit a feedback message based on a rule or a configuration, wherein the rule includes selecting one of the multiple traffic channels on one of the multiple cells based on a cell index, wherein a cell with a lowest cell index is selected among the multiple cells.

2. The method of claim 1, wherein the feedback message includes a channel state information (CSI).

3. The method of claim 1, wherein the cell with the lowest cell index is selected after skipping the cell with transport block on multiple slots (TBoMS) transmission among the multiple cells.

4. The method of claim 1, wherein the rule includes selecting one of the multiple traffic channels on the multiple cells based on a transmission type of the traffic channel, wherein the transmission type includes at least one of: a single physical uplink shared channel (PUSCH), multiple PUSCHs on one cell, PUSCH repetition type A, PUSCH repetition type B, TBoMS, wherein multi-transmission-time-interval (multi-TTI) scheduling includes scheduling multiple PUSCHs on one cell by a single DCI.

5. The method of claim 4, the one of the multiple traffic channels on the multiple cells is selected based on the transmission type of the traffic channel, wherein the transmission type includes at least one of: a cell scheduled with a single physical uplink shared channel (PUSCH) with a lowest or configured cell index among the multiple cells is selected; if there is no single PUSCH on any cell in a multi-cell scheduling, a cell scheduled with multi-TTI scheduling with the lowest or configured cell index among the multiple cells is selected; if there is no single PUSCH or multi-TTI scheduling on any cell in the multi-cell scheduling, a cell scheduled with PUSCH repetition with the lowest or configured cell index among the multiple cells is selected; if there is no single PUSCH, a multi-TTI scheduling or PUSCH repetition on any cell in the multi-cell scheduling, a cell scheduled using TBoMS with the lowest or configured cell index among the multiple cells is selected.

6. The method of claim 1, wherein the wireless device is configured with a configured grant (CG) type 2 PUSCH or a semi-persistent scheduling (SPS) physical downlink shared channel (PDSCH) on one or more cells and activation or deactivation of the CG type 2 PUSCH or the SPS PDSCH according to the DCI.

7. The method of claim 6, wherein the cells scheduled with at least one of the CG type 2 and the SPS in a multi-cell scheduling are activated or deactivated simultaneously or independently.

8. The method of claim 6, wherein the DCI includes a first DCI for scheduling a first PDSCH and one or more second DCIs in the first PDSCH, and wherein each second DCI includes a field to indicate each second DCI itself with cell radio network temporary identifier (C-RNTI) or configured scheduling radio network temporary identifier (CS-RNTI).

9. The method of claim 1, wherein the multiple traffic channels include PUSCH, and wherein a maximum number of PUSCHs is determined based on at least one of:

a maximum number of configured cells for a multi-cell scheduling;

a maximum number of configured PUSCHs for a multi-TTI scheduling across cells configured with multi-TTI scheduling within the multi-cell scheduling;

a number of cells configured with a multi-TTI scheduling; and a higher layer signaling configuration.

10. The method of claim 1, wherein the multiple cells scheduled by the DCI comprise at least one unlicensed cell, and wherein at least one field in the DCI is used by at least one of: a shared indication for partial or all unlicensed cells within the multiple cells; a shared indication for partial or all licensed cells within the multiple cells; a shared indication for all multiple cells and be ignored for the licensed cells within the multiple cells; or a separate indication for licensed cells within the multiple cells and unlicensed cells within the multiple cells.

11. A method of wireless communication, comprising:

configuring, by a network device, multiple traffic channels on multiple cells, the multiple traffic channels on the multiple cells being scheduled by a downlink control information (DCI); and receiving the multiple traffic channels on the multiple cells, wherein one of the multiple traffic channels on the multiple cells is selected to transmit a feedback message based on a rule or a configuration, wherein the rule includes selecting one of the multiple traffic channels on one of the multiple cells based on a cell index, wherein a cell with a lowest cell index is selected among the multiple cells.

12. The method of claim 11, wherein a configured grant (CG) type 2 physical uplink shared channel (PUSCH) or a semi-persistent scheduling (SPS) physical downlink shared channel (PDSCH) is configured on one or more cells and activation or deactivation of the CG type 2 PUSCH or the SPS PDSCH according to the DCI.

13. The method of claim 11, wherein the multiple traffic channels include one or more PUSCHs, and wherein a maximum number of PUSCHs is determined based on at least one of:

a maximum number of configured cells for a multi-cell scheduling;

a maximum number of configured PUSCHs for a multi-TTI scheduling across cells configured with multi-TTI scheduling within the multi-cell scheduling;

a number of cells configured with a multi-TTI scheduling; or a signaling layer configuration.

14. An apparatus for wireless communication comprising at least one processor that is configured to carry out a method, comprising:

receiving a configuration of multiple traffic channels on multiple cells scheduled by a downlink control information (DCI); and transmitting the multiple traffic channels on the multiple cells, wherein one of the multiple traffic channels on the multiple cells is selected to transmit a feedback message based on a rule or a configuration, wherein the rule includes selecting one of the multiple traffic channels on one of the multiple cells based on a cell index, wherein a cell with a lowest cell index is selected among the multiple cells.

15. The apparatus of claim 14, wherein the feedback message includes a channel state information (CSI).

16. The apparatus of claim 14, wherein the cell with the lowest cell index is selected after skipping the cell with transport block on multiple slots (TBoMS) transmission among the multiple cells.

17. The apparatus of claim 14, wherein the rule includes selecting one of the multiple traffic channels on the multiple cells based on a transmission type of the traffic channel, wherein the transmission type includes at least one of: a single physical uplink shared channel (PUSCH), multiple PUSCHs on one cell, PUSCH repetition type A, PUSCH repetition type B, TBoMS, wherein multi-transmission-time-interval (multi-TTI) scheduling includes scheduling multiple PUSCHs on one cell by a single DCI.

18. The apparatus of claim 14, wherein the apparatus is configured with a configured grant (CG) type 2 PUSCH or a semi-persistent scheduling (SPS) physical downlink shared channel (PDSCH) on one or more cells and activation or deactivation of the CG type 2 PUSCH or the SPS PDSCH according to the DCI.

19. The apparatus of claim 14, wherein the multiple traffic channels include PUSCH, and wherein a maximum number of PUSCHs is determined based on at least one of:

a maximum number of configured cells for a multi-cell scheduling;

a maximum number of configured PUSCHs for a multi-TTI scheduling across cells configured with multi-TTI scheduling within the multi-cell scheduling;

a number of cells configured with a multi-TTI scheduling; and a higher layer signaling configuration.

20. The apparatus of claim 14, wherein the multiple cells scheduled by the DCI comprise at least one unlicensed cell, and wherein at least one field in the DCI is used by at least one of: a shared indication for partial or all unlicensed cells within the multiple cells; a shared indication for partial or all licensed cells within the multiple cells; a shared indication for all multiple cells and be ignored for the licensed cells within the multiple cells; or a separate indication for licensed cells within the multiple cells and unlicensed cells within the multiple cells.

* * * * *